Feb. 11, 1958 H. F. L. CAMERON 2,823,270
TESTING ARRANGEMENTS FOR TELECOMMUNICATION SYSTEMS
Filed Oct. 6, 1954
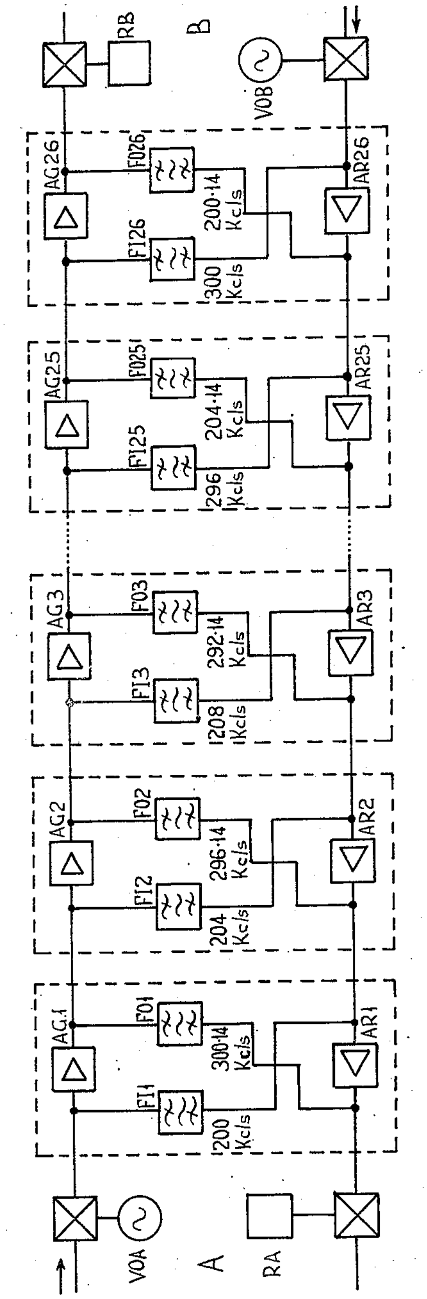
Hector Francis Lovett Cameron
Inventor 2,823,270

TESTING ARRANGEMENTS FOR TELECOMMUNICATION SYSTEMS

Hector Francis Lovett Cameron, Taplow, England, assignor to British Telecommunications Research Limited, Taplow, England, a British company Application October 6, 1954, Serial No. 460,681

Claims priority, application Great Britain October 15, 1953

6 Claims. (Cl. 179—175.31)

The present invention relates to testing arrangements for telecommunication systems and particularly systems employing equipment capable of dealing with a very wide frequency spectrum i. e. so-called wide-band systems.

As the number of circuits operated over a single wide-band system is increased with a consequent increase in the number of line amplifiers, some of which may be sited in relatively inaccessible locations, it becomes increasingly important to have available some means of locating a faulty amplifier from an attended station at one end of a chain of repeater stations and also of frequently checking the performance of the line equipment in order to detect incipient faults before they cause a complete system failure. With the usual form of line amplifier having a large amount of negative feedback, the most satisfactory way of testing deterioration in performance is obtained by a measurement of the amount of harmonic produced by a known input level of fundamental tone and the amount of intermodulation produced from two input tones of differing frequencies. Such a test coupled with a measurement of the gain of the amplifiers gives a very complete picture of its performance quality.

One arrangement for dealing with the above problems is described in Patent No. 2,686,849, granted August 17, 1954, and it is the chief object of the present invention to provide a similar but improved arrangement involving less equipment and offering certain advantages in operation.

According to the present invention each repeater station has associated with it two filters connected respectively between the inputs and outputs of the amplifiers for the two directions of working, these filters both having narrow pass-bands which are different for the two filters in any one station and for the filters in different stations on the same portion of line between two attended stations. By suitable choice of the pass-bands of the filters it is possible to make use of testing tones which will serve to effect a test of one amplifier at a time without the need for taking special steps to suppress the intermodulation products from any of the other amplifiers. Preferably the filters will be normally disconnected and will be connected up between the "go" and "return" lines by any suitable form of remote switching when a test is to be performed.

The invention will be better understood from the following description of one method of carrying it into effect which should be taken in conjunction with the accompanying drawing. This shows diagrammatically the different stations on a line having separate "go" and "return" channels which may be coaxial cables. The drawing gives typical figures for the values of the mid-frequencies of the various filter pass-bands at the different stations. It will be seen from these figures that it is assumed there may be as many as 26 stations but for reasons which will be pointed out, certain advantages are obtained if the number of intermediate stations is not greater than 13.

It will be seen that the band-pass filters FI1, FI2 . . .

FI26 connected between the inputs of the respective amplifiers at any station have the pass frequencies 200, 204, 208 . . . 296, 300 kc./s. for the different stations while the associated filters FO1, FO2 . . . FO26 between the outputs of the amplifiers have pass-frequencies of 300.14, 296.14, 292.14 . . . 204.14, 200.14 kc./s. at successive stations counting in the same direction.

For measurement of the gain of the repeaters AG1, AG2 . . . AG26, AR1, AR2 . . . AR26, test currents of frequencies 200, 204, 208 . . . 300 kc./s. will be sent successively from the variable frequency oscillator VOA at A and the levels measured of the signals received back at A on the receiving equipment RA. By this means different numbers of amplifiers are included in the loop circuit on the different occasions. Similar tests may be made from the variable oscillator VOB at B using frequencies of 200.14, 204.14 . . . 300.14 kc./s. corresponding to the pass frequencies of the other group of filters and measuring what is received by the equipment RB. These frequencies may also be used for testing from A and similarly the range of frequencies 200, 204 . . . 300 kc./s. may be used for testing from B.

For measurement of second order intermodulation products, a single tone of 500.14 kc./s. is sent down the "go" line from the main station A and a series of tones spaced at 4 kc./s. intervals from 200–300 are sent down the "return" line from main station B. At the appropriate intermediate station the test current in the band 200–300 kc./s. for instance 208 kc./s. will pass through the bridging filter FI3 and combine with the single tone of 500.14 kc./s. The difference frequency A–B i. e. 292.14 kc./s. after traversing the "go" amplifier AG3 will now pass through the second bridging filter FO3 and pass back down the line to station A to be measured by equipment RA. It may be pointed out that the two bridging filters at any one station preferably have a frequency difference of not less than 4 kc./s. to facilitate the separation of the second order tone from the fundamental.

For third order intermodulation tests a series of tones from 700.14 to 800.14 kc./s. at 4 kc./s. intervals would be sent from station A and a series of tones of 200 to 300 kc./s. at 4 kc./s. intervals would be sent from station B. The difference frequencies A–2B then correspond to the pass frequencies of the different filters and consideration will show that the operation is generally similar to the case of the second order tones and individual amplifiers in the "go" path can thus be tested.

In order to test the repeaters in the "return" path, the tests are reversed, that is to say tones in the band 200 to 300 kc./s. are sent from A and a tone of 500.14 kc./s. and tones in the band 700.14 to 800.14 kc./s. are sent from B.

It should be explained that the general formulae for the derivation of the mid frequencies of the pass-bands of the two filters at the various stations are:

$$B+nk \text{ kc./s.}$$

$$B+(N-n)k+\Delta \text{ kc./s.}$$

where B is chosen in relation to the general system requirements and represents the lowest test frequency used, $k$ is a constant which in a system using 4 kc./s. spacing between channels will most naturally be 4, N is one less than the number of intermediate stations, $n$ may have any integral value from 0 to N depending on the station concerned and $\Delta$ is some relatively small frequency displacement which is convenient to offset the test tones so as to minimise interference with information channels. For the figures quoted above B is 200, N is 25 and $\Delta$ is 0.14. The frequencies employed for gain tests will then be:

$$B+nk$$

$$B+(N-n)k+\Delta$$

corresponding to the filter values while the frequencies transmitted from A for second order tests will be $$2B+Nk+\Delta$$

and for third order tests $$3B+(N+n)k+\Delta$$

For both second and third order tests from B the frequency will be $$B+nk$$

It will be understood that all the 26 test frequencies need not be used, the number required depending on the number of repeater stations. If there are not more than 14 sections i. e. 13 repeater stations, it is possible to limit the filters to the frequencies 200 to 248 kc./s. and 300.14 to 252.14 kc./s. and this is likely to be an advantage as the filter requirements can then be less stringent with regard to their discrimination at the critical 140 c./s. from the pass frequency.

It will be noted that with this arrangement there are no series stop-band filters in the main transmission line and this in addition to saving the cost of the filter avoids any question of switching in the transmission circuit which would otherwise be necessary where specially high quality transmission is important. As already mentioned, it is intended that the filters would only be switched into circuit when required and this could be done by a known method of remote control. Since only bridging filters are concerned, any fault in the switching arrangements would not disable the main transmission system but merely affect the ability to make test measurements. Preferably the switching arrangements would operate on all the stations simultaneously and they could conveniently be interlocked so that for instance filters could only be switched into one pair of coaxial tubes at a time in a cable containing a plurality of such pairs. Moreover in this case a single set of filters could be used for all the pairs of coaxial tubes concerned. This would ensure that the testing operation could not be hindered by interference from test tones on other links.

It will be appreciated that the term "tone" has been used as a matter of convenience in referring to the currents used for testing, even though such currents are not of audio frequency.

I claim:

1. An arrangement for testing amplifiers in a plurality of intermediate stations located on a signalling line comprising separate "go" and "return" paths extending between two end stations in which at each intermediate station a band pass filter is arranged to be connected between the inputs of the "go" and "return" amplifiers and a second band-pass filter between the outputs of the said amplifiers, the pass bands for the filters in any one station being different from each other and different from those in any other station on the same portion of line between the two end stations.

2. An arrangement as claimed in claim 1 in which the values of the pass-bands of the filters connecting the inputs of the amplifiers in the different stations increase at succeeding stations in one direction while the values of the pass-bands of the filters connecting the outputs of the amplifiers increase at succeeding stations in the opposite direction.

3. An arrangement as claimed in claim 1, in which the filters are used in common for a plurality of pairs of coaxial tubes in a cable.

4. An arrangement as claimed in claim 1, in which the filters at all stations are switched into circuit simultaneously in response to a control operation at one of the end stations.

5. In a wideband telecommunication system employing a signalling line connecting two attended repeater stations by way of a plurality of intermediate unattended repeater stations, separate "go" and "return" conductors being provided for the two directions of transmission with separate amplifiers associated with each conductor in each intermediate station, a testing arrangement comprising in combination, a first bandpass filter at each intermediate station connected between the respective inputs of the amplifiers for the two directions of transmission, the passbands of said filters being different at the different intermediate stations, a second bandpass filter at each intermediate station connected between the respective outputs of the amplifiers for the two directions of transmission, the passbands of said second filters being different at the different intermediate stations and the passbands of said first and second filters at any one intermediate station being different, a first variable frequency alternating current source in one of said attended stations, a second variable frequency alternating current source in the other of said attended stations, means for simultaneously connecting said first source to the "go" conductor in said one station and said second source to the "return" conductor in said other station, means for successively altering the frequency of said second source so as to correspond with the passbands of said first bandpass filters, whereby with suitable choice of the frequency of said first source difference tones of frequencies corresponding to the passbands of said second bandpass filters are produced and means in said one attended station for analysing the alternating current received thereat over said "return" conductor.

6. In a wideband telecommunication system employing a signalling line connecting two attended repeater stations by way of a plurality of intermediate unattended repeater stations, separate "go" and "return" conductors being provided for the two directions of transmission with separate amplifiers associated with each conductor in each intermediate station, a testing arrangement comprising in combination, a first bandpass filter at each intermediate station connected between the respective inputs of the amplifiers for the two directions of transmission, the passbands of said filters being different at the different intermediate stations, a second bandpass filter at each intermediate station connected between the respective outputs of the amplifiers for the two directions of transmission, the passbands of said second filters being different at the different intermediate stations and the passbands of said first and second filters at any one intermediate station being different, a first variable frequency alternating current source in one of said attended stations, a second variable frequency alternating current source in the other of said attended stations, means for simultaneously connecting said first source to the "go" conductor in said one station and said second source to the "return" conductor in said other station, means for successively altering the frequency of said first source, means for successively altering the frequency of said second source so as to correspond with the passbands of said first bandpass filters, whereby with suitable choice of the frequency of said first source difference tones of frequencies corresponding to the passbands of said second bandpass filters are produced and means in said one attended station for analysing the alternating current received thereat over said "return" conductor.

References Cited in the file of this patent

UNITED STATES PATENTS

| | | |
|---|---|---|
| 2,315,435 | Leibe | Mar. 30, 1943 |
| 2,580,097 | Ilgenfritz | Dec. 25, 1951 |
| 2,611,041 | Cooper | Sept. 16, 1952 |